July 14, 1931.    R. W. DEARDORFF    1,814,898
MEASURING SYSTEM
Filed March 13, 1925    2 Sheets-Sheet 1

INVENTOR
R. W. Deardorff
BY
ATTORNEY

July 14, 1931.    R. W. DEARDORFF    1,814,898
MEASURING SYSTEM
Filed March 13, 1925    2 Sheets-Sheet 2

INVENTOR
R. W. Deardorff
BY
ATTORNEY

Patented July 14, 1931

1,814,898

UNITED STATES PATENT OFFICE

RALPH W. DEARDORFF, OF KENSINGTON, CALIFORNIA, ASSIGNOR TO AMERICAN TELEPHONE AND TELEGRAPH COMPANY, A CORPORATION OF NEW YORK

MEASURING SYSTEM

Application filed March 13, 1925. Serial No. 15,346.

This invention relates to measuring systems and particularly to means for, and methods of, determining the characteristics of any complex source of alternating currents.

One object of the invention is to provide a method and means for determining the magnitude of the voltage of each of the waves of any complex source of alternating currents.

Another object is to provide a method of, and a means for, determining the various frequencies present in any complex source of alternating current waves.

Another object of the invention is to provide a simple, portable means for analyzing the currents of any complex source of alternating currents.

A further object of the invention is to employ a visible indicator to show when two frequencies are of equal magnitude.

It is a further object of this invention to provide an audible and/or visible indicator to show when two frequencies are nearly equal.

At present, there is in use apparatus which is elaborately equipped for analyzing the characteristics of each of the waves of a source of alternating currents. The system employed for this analysis has a plurality of filter circuits in combination with high gain amplifiers and a detector. The system has a large amount of bulky apparatus, practically prohibiting its use as portable equipment. The arrangements of this invention, however, necessitate only a small amount of apparatus, making the use thereof readily adaptable as portable equipment.

Figure 1:
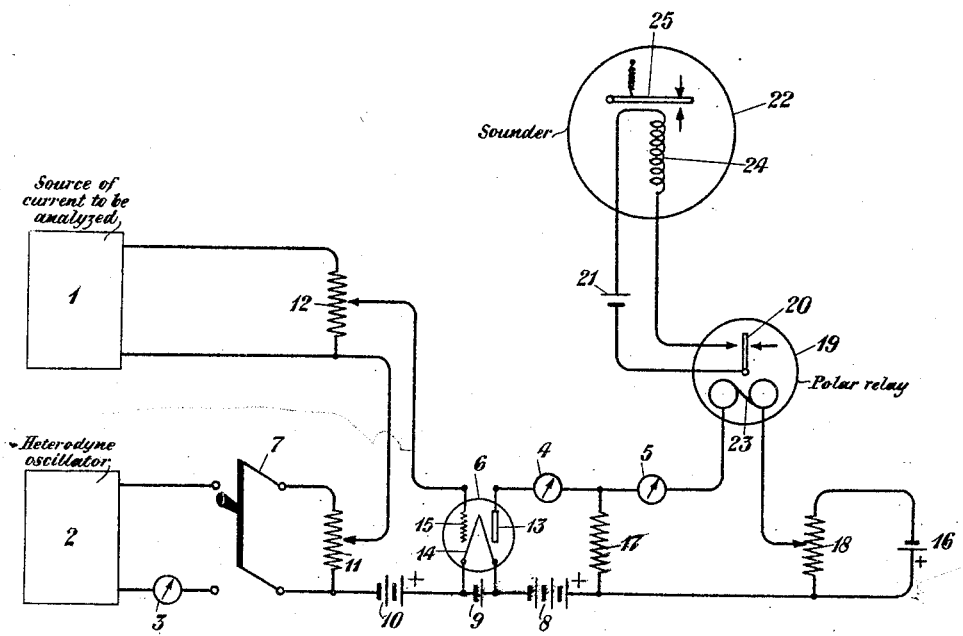
Figure 2:
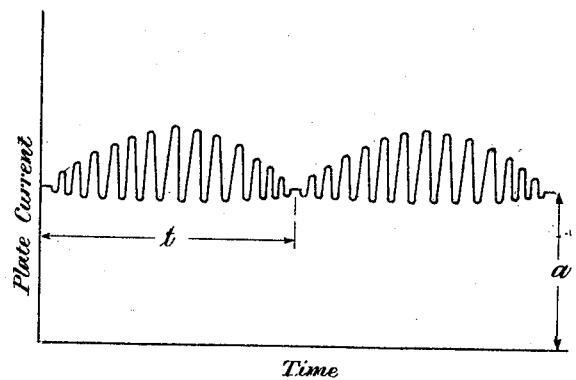
Figure 3:
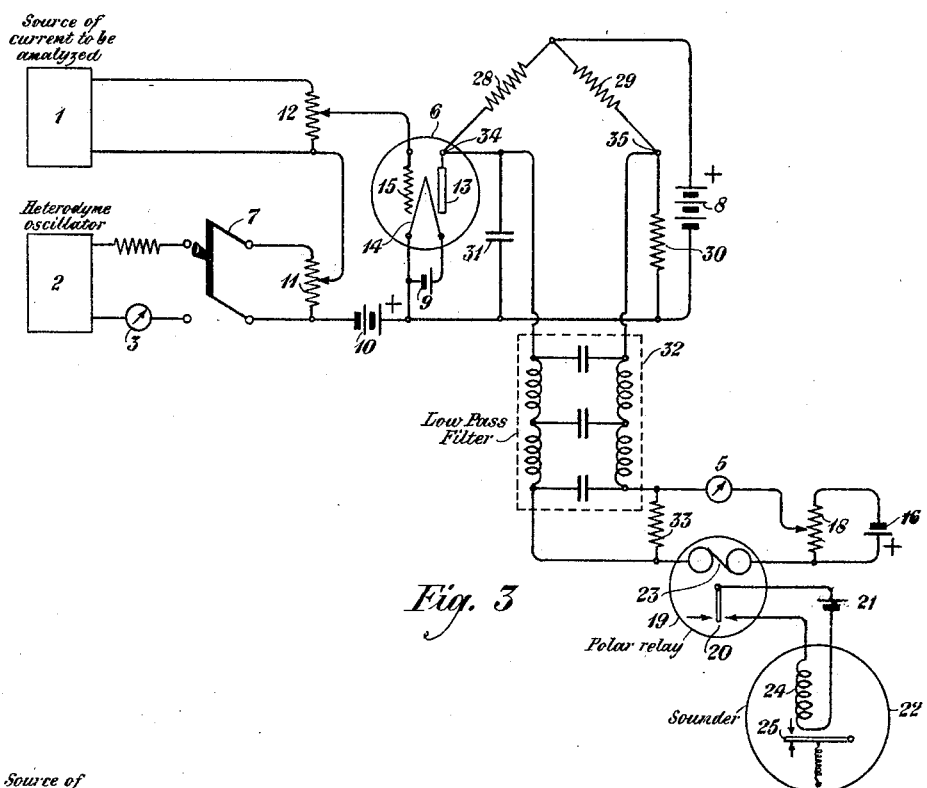
Figure 4:
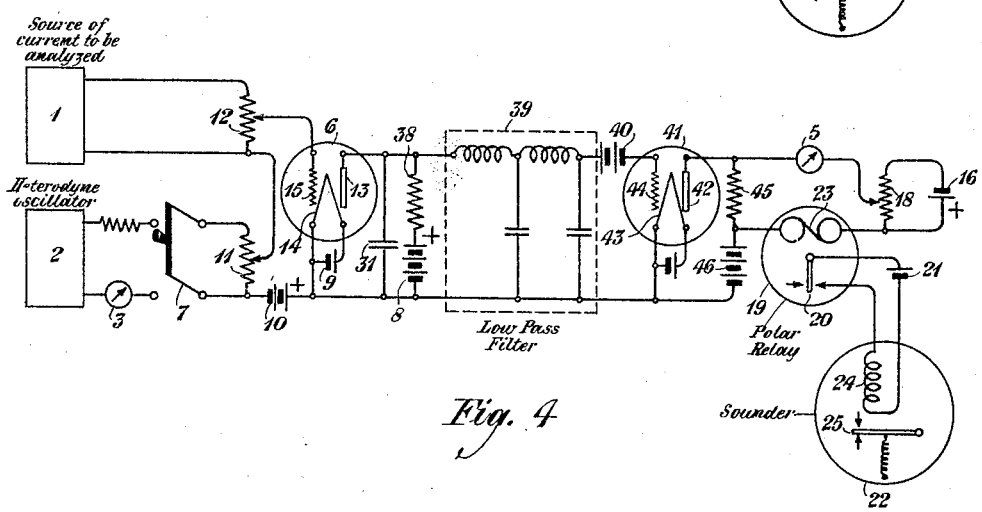

This invention will be more clearly understood by reference to the accompanying drawings, wherein Figure 1 represents a diagrammatic view of a system embodying the invention in its preferred form; Fig. 2 represents a cure of the plate current plotted against time; Fig. 3 diagrammatically represents an arrangement in which the plate circuit of the detector tube is included in one arm of a Wheatstone bridge to obtain greater sensitivity, and Fig. 4 represents an arrangement in which two detector tubes are connected in tandem for even greater sensitivity.

Referring more particularly to Fig. 1, a vacuum tube detector 6 is shown, consisting of plate 13, filament 14 and grid 15. Batteries 8, 9 and 10 are plate, filament and grid batteries respectively. Potentiometer 12 is provided to adjust the amount of the voltage of the particular wave of the complex source 1 to be impressed upon the grid and filament. When the switch 7 is closed, the meter 3 will indicate the amount of current flowing from the heterodyne oscillator 2, designed to have an output current of undistorted sinusoidal wave form free from harmonics. Meter 4 shows the amount of the current flowing in the plate circuit of the detector 6, and meter 5, a more sensitive meter than 4, is operated when there is a difference between the potentials set up across the terminals of resistance 17 and potentiometer 18. Potentiometer 18 may be adjusted to set up the same potential across its terminals as is set up across the the terminals of resistance 17. When current flows through meter 5, polar relay 19 will operate and in turn cause the armature 25 of the sounder 22 to vibrate, effecting audible sounds.

The arrangment of Fig. 1 operates in the following manner: A source of current to be analyzed 1, is connected to the input of the detector 6 in series with potentiometer 11 and grid battery 10. The magnitude of the potential of the wave analyzed is regulated by moving the arm of the potentiometer 12. Switch 7 remains open. The resistance of potentiometer 11, being negligible as compared with the input impedance of the tube, does not affect the potential that source 1 impresses between the grid and filament of the detector 6. The voltage of the grid battery 10 is preferably adjusted so that the impulses impressed upon the grid operate on the plate current-grid voltage characteristic curve of the tube between the points where the plate current is zero and where the tube begins to act as an amplifier. Furthermore the detector 6 is of sufficient power capacity to prevent any overloading action when the complex wave form from the source 1 is impressed between the grid 15 and the filament 14.

When the source to be analyzed is connected as described, the plate current will change in value, as shown by meter 4. Meter 5, which is more sensitive, is operated when the potential drop across resistance 17, due to the current flowing in the plate circuit as measured by meter 4, is different from the potential drop across potentiometer 18, due to the battery 16. Potentiometer 18 is then adjusted until the reading of meter 5 is zero, thereby equalizing the potential drops across resistance 17 and potentiometer 18.

Any change in the current flowing through meter 4 is readily noticeable on meter 5. The heterodyne oscillator 2 is now also connected to the grid circuit by closing switch 7, meter 3 showing the amount of the current flowing from the heterodyne oscillator 2 through potentiometer 11. The magnitude of the current flowing from oscillator 2 is adjusted so that the readings on meter 5 remain on the scale. The frequency of the heterodyne oscillator 2 is then adjusted until the pointer of meter 5 moves slowly back and forth, indicating thereby that the frequency of one of the waves emitted by source 1 and the frequency of the heterodyne oscillator 2 are almost the same. Potentiometer 11 adjusts the potential of the heterodyne oscillator 2 until the pointer of meter 5 reaches its lowest minimum value. By the lowest minimum value is meant the lowest deflection or reading that can be secured on meter 5 by the adjustment of potentiometer 11. This is called the lowest minimum value because a minimum value is obtained once in each cycle traversed by the pointer of the meter. Thus, an especially low minimum value may be obtained upon the manipulation of potentiometer 11. Having secured the lowest minimum value possible upon adjustment of potentiometer 11, a still lower minimum value, which can be made substantially equal to the zero deflection of the pointer of meter 5, can be obtained by further adjusting potentiometer 18. This may be accomplished by moving the arm of potentiometer 18 to such a position that very little of the current that flows through meter 5 is supplied by battery 16, i. e., the current that flows through meter 5 is supplied almost entirely by the difference in potential between the extremities of resistance 17. When the low frequency component, i. e., the component corresponding to the difference of the two beating frequencies, is very close to the minimum value, the potential difference across the extremities of resistance 17 substantially equals the potential difference across the potentiometer 18. At this instant, the armature of the polar relay 19 will move from one fixed contact to the other, thus operating the armature 25 of the sounder 22. Therefore, a circuit including battery 21, armature 20 and winding 24 is made and broken at exactly the same rate that beats are being produced by the two slightly different frequencies at sources 1 and 2. A check on this lowest minimum value may be made by moving the arm of potentiometer 11 to find if a lower point on potentiometer 18 is obtainable. The value of the unknown voltage may be determined since the values of the current at 3, the total resistance of potentiometers 11 and 12, and the proportions of the total resistances that the arms of potentiometers 11 and 12 divide the resistances into, are all known.

Obviously the current that flows through the meter 3 when multiplied by the total resistance of the potentiometer 11 will give the total voltage across the terminals of the potentiometer 11. The setting of the arm of potentiometer 11 determines the magnitude of the portion of the voltage of the heterodyne oscillator 2 which is applied to the input circuit of the vacuum tube detector or modulator 6. When the pointer of meter 5 reaches its lowest minimum value, then the magnitude of the portion of the voltage of the source 1 which is applied to the input circuit of the vacuum tube detector or modulator 6 equals the magnitude of the portion of the voltage of the heterodyne oscillator 2 which is also applied thereto. Knowing the setting of the arm of the potentiometer 12 and the total resistance of the potentiometer 12, the magnitude of the voltage of the source 1 may be readily determined.

In Fig. 2, a curve is represented showing the variation of the plate current plotted against time when the frequency of the heterodyne oscillator 2 beats with the frequency of the particular wave analyzed at 1. When the voltage of the heterodyne wave is equal to the voltage of the particular wave emitted by source 1, the envelopes of the wave form will coincide after time "$t$" elapses, and for this particular heterodyne voltage the ordinate "$a$" will represent the minimum plate current value for the low frequency component. If the beating frequencies were of unequal voltages and of unequal frequencies, the envelopes of the plate current curve would not coincide; and if the beating frequencies were exactly equal and in phase the envelopes would be parallel lines.

This invention is characterized by such complex physical processes that a mathematical analysis of the phenomena involved seems best adapted to the elucidation of the invention. The varying current in the output of the detector tube may be expressed as a function of the sinusoidal voltage impressed upon the input by the simple series $$I_b = a_0 + a_1 e + a_2 e^2 \cdots + a_n e^n \quad (1)$$

The total input voltage on the tube may be taken as $$e = e_1 \sin pt + e_2 \sin qt \quad (2)$$

where $$\frac{p}{2\pi}$$

and $$\frac{q}{2\pi}$$

represent the frequencies of the currents in the unknown source 1 and the heterodyne oscillator 2, respectively. $I_b$ will, in general, have the form of an irregular wave and will therefore comprise currents of different frequencies and a direct current component. This series converges so rapidly that all quantities of higher order than the second may be neglected. Substituting the value for the input voltage, the current in the plate circuit of the detector tube then becomes $$I_b = a_0 + a_1(e_1 \sin pt + e_2 \sin qt) + a_2(e_1 \sin pt + e_2 \sin qt)^2 \quad (3)$$

The second term of this expression represents two alternating currents of comparatively high frequency which have no effect on indicator 4 and may therefore be neglected. Expanding the expression, omitting the second term, the equation becomes $$I_b = a_0 + a_2 e_1^2 \sin^2 pt + a_2 e_2^2 \sin^2 qt + 2 a_2 e_1 e_2 \sin pt \sin qt \quad (4)$$

By a well known trigonometric transformation it results that $$I_b = a_0 + \frac{a_2 e_1^2}{2} - \frac{a_2 e_1^2}{2} \cos 2pt + \frac{a_2 e_2^2}{2} - \frac{a_2 e_2^2}{2} \cos 2qt + a_2 e_1 e_2 \cos (p-q)t - a_2 e_1 e_2 \cos (p+q)t \quad (5)$$

The third, fifth and seventh terms of this expression represent alternating current components of comparatively high frequencies, and may also be neglected. The sixth term, however, represents a current of a frequency $$\frac{p-q}{2\pi},$$

which may be adjusted to a low value, for example, one or two cycles per second, and is retained with the other direct plate current components. The direct current components and the very low frequency alternating current component appear in the plate circuit, and may be represented by the following expression $$I_b = a_0 + \frac{a_2 e_1^2}{2} + \frac{a_2 e_2^2}{2} + a_2 e_1 e_2 \cos (p-q)t \quad (6)$$

This latter expression may be considered as representing a varying direct current which periodically swings through minimum values in accordance with the frequency represented by $$\frac{p-q}{2\pi}.$$

If $e_1$ and $e_2$ are assumed constant, $I_b$ will have a minimum value when $\cos (p-q)t = -1$ and therefore $$I_b = a_0 + \frac{a_2 e_1^2}{2} + \frac{a_2 e_2^2}{2} - a_2 e_1 e_2 \quad (7)$$

As $e_2$ is varied, the minimum of the minimum values represented by expression (7) may be obtained by taking the first derivative of the expression with respect to $e_2$, and equating the result to zero.

$$\frac{\delta I_b}{\delta e_2} = a_2 e_2 - a_2 e_1 = 0 \quad (8)$$

It results from this that the minimum value of the periodic swings occurs when $$e_2 = e_1 \quad (9)$$

Thus it appears that the amplitude of the particular component analyzed in the input circuit equals the amplitude of the current supplied by the local oscillator and indicated by means of the meter 3 and the resistance 11, when the apparatus is adjusted so that the needle of meter 5 reaches a minimum value during the course of a slow swing.

Fig. 3 represents a modification of the arrangements of Fig. 1. The plate circuit of the detector tube 6 is placed in one arm of a Wheatstone bridge, and is supplied by current from the plate battery 8 which is connected in one diagonal of the Wheatstone bridge. The other arms of the Wheatstone bridge are formed by elements 28, 29, and 30. A low pass filter 32 and the measuring devices are connected in the other diagonal. Resistance 33 resembles element 17 of Fig. 1. By suitably proportioning the arms of the bridge, the rate of change of the current through the diagonal including the low pass filter may be made much larger than the rate of change of the current through the plate filament circuit. Thus the sensitivity of the arrangement to receive the maxima and the minima of the signals is greatly increased.

In Fig. 4, a second detector tube 41 is connected in tandem with the detector tube 6 through a low pass filter 39. The plate 13 of tube 6 is connected to plate battery 8 through a resistance 38. The plate 13 and filament 14 of tube 6 are shunted by a condenser 31. Tube 41 may also have three electrodes, a plate 42, a filament 43, and a grid 44. A battery 40 may be employed to suitably bias the grid electrode of tube 41. The necessary plate current for tube 41 is derived from a battery 46, this plate current flowing through the resistance 45. The low pass filter effectively attenuates the high frequency currents. The minima which appear in the output circuit of the detector tube 6 are found in the output circuit of the detector tube 41 as maxima because of a shift in the phase relationship through 180°. The detector tube 41 also accentuates the sharpness of the maxima. Further sharpness and sensitivity may be obtained by connecting other detectors in tandem with the detector tubes of this arrangment.

Although the arrangements of this invention have been prepared for the analysis of a complex current wave, similar arrangements may also be applied to the analysis of attenuation, crosstalk, and other like measurements.

The invention is not limited to the exact circuits herein shown and described, as it is obvious that various modifications may be made without departing from the spirit of the invention or the scope of the appended claims.

What is claimed is:

1. In combination, a detector tube, a source emitting a current of unknown frequency, a heterodyne oscillator emitting a current of known frequency, potentiometers to equalize the voltage values of said currents, said currents being impressed on the input circuit of said detector tube, a resistance serially arranged in the output circuit of said detector tube, a potentiometer connected across the terminals of a battery which may be adjusted to have a potential drop across its terminals to equal the potential drop across the terminals of said resistance in said output circuit, a meter, a polar relay, said meter and the winding of said polar relay being serially arranged in a circuit with said resistance and said potentiometer, the pointer of said meter indicating when said currents in said input circuit are equal in voltage, and also indicating by its movement the differences between the frequencies of said currents in said input circuit, and a sounder, actuated by the armature of said polar relay, audibly indicating the difference between the frequencies of said currents.

2. In a testing circuit, in combination, a source emitting an alternating current wave of an unknown frequency, a source emitting an alternating current of a known frequency, a detecting device, two potentiometers connected respectively to said sources and in series relationship in the input circuit of said detecting device, means associated with the output circuit of said detecting device for effectively attenuating all alternating current components resulting from modulation, except the one having a frequency equal to the difference between the frequencies of the impressed currents and means including a polar relay connected to the output circuit of the detecting device to provide a definite indication when the amplitude of the known alternating current wave is in a fixed and predetermined relation to the amplitude of the unknown alternating current wave.

3. In an electrical testing system, the combination of a source of current of an unknown frequency, a source of current of a known frequency, a detector tube, two potentiometers connected in series relationship in the input circuit of said detector tube so that said currents may be impressed on the input circuit of said detector tube at substantially equal voltages, said detector tube functioning to produce the modulated components of the currents impressed on the input circuit thereof, means for effectively attenuating all currents in the output circuit of said detector tube except the current having a frequency which is equal to the difference between the frequencies of the currents in the input circuit of said detector tube, and means including a polar relay connected to the output circuit of said detector tube and a sounder controlled by the polar relay for observing the difference between the frequencies of the currents in the input circuit.

4. In an electrical testing system, in combination, a detector tube, means for producing one voltage of unknown frequency, means for producing another voltage of known frequency, a pair of potentiometers connected in series with each other in the input circuit of said detector tube so that said voltages may be impressed on the input circuit of said detector tube at substantially equal magnitudes, a filter associated with the output circuit of said detector tube to eliminate all of the currents resulting from modulation except the current having a frequency equal to the difference between the frequencies of the currents in the input circuit, and means including a polar relay connected to the output circuit for observing the value of the difference in the frequencies.

5. In an electrical testing system, in combination, a modulator, means for producing a current of an unknown frequency, means for producing a current of a known frequency, a pair of potentiometers connected in series with each other in the input circuit of said modulator for adjusting the voltage values of said currents to equality and for impressing said currents on the input circuit of said modulator, means associated with the output circuit of said modulator to effectively attenuate all of the currents resulting from modulation except the current having a frequency equal to the difference between the frequencies of the currents in the input circuit of said modulator, and means including a polar relay connected to the output circuit for observing the minima represented by the amplitude of the resulting wave.

6. In a testing system, the combination of a source emitting a wave of unknown frequency and voltage, a source emitting a wave of known frequency and of adjustable voltage, a pair of potentiometers connected respectively to said sources for bringing the voltage values of said waves to equality, a modulator for beating said waves, said modulator being connected in series with said potentiometers, means for separating the direct current component and a wave having a frequency corresponding to the difference in frequencies of the beating currents from all other waves and for suppressing the effect of the latter waves, means including a source of direct current to substantially neutralize the direct current component separated after modulation, and means including a polar relay to determine the frequency of the alternating current component separated after modulation.

7. In a testing system, the combination of a source of current of unknown frequency, a source of current of known frequency, two potentiometers connected respectively to said sources, a detector tube having input and output circuits, said potentiometers being connected in series relationship in the input circuit of said detector tube to control and equalize the voltages of both sources simultaneously impressed on said input circuit, and means including a polar relay connected to the output circuit of said detector tube to indicate the difference between the frequencies of the waves of said sources.

In testimony whereof, I have signed my name to this specification this 28th day of February, 1925.

RALPH W. DEARDORFF.